Aug. 13, 1940.   E. J. SHAFFER   2,211,173
PIPE COUPLING
Filed June 6, 1938
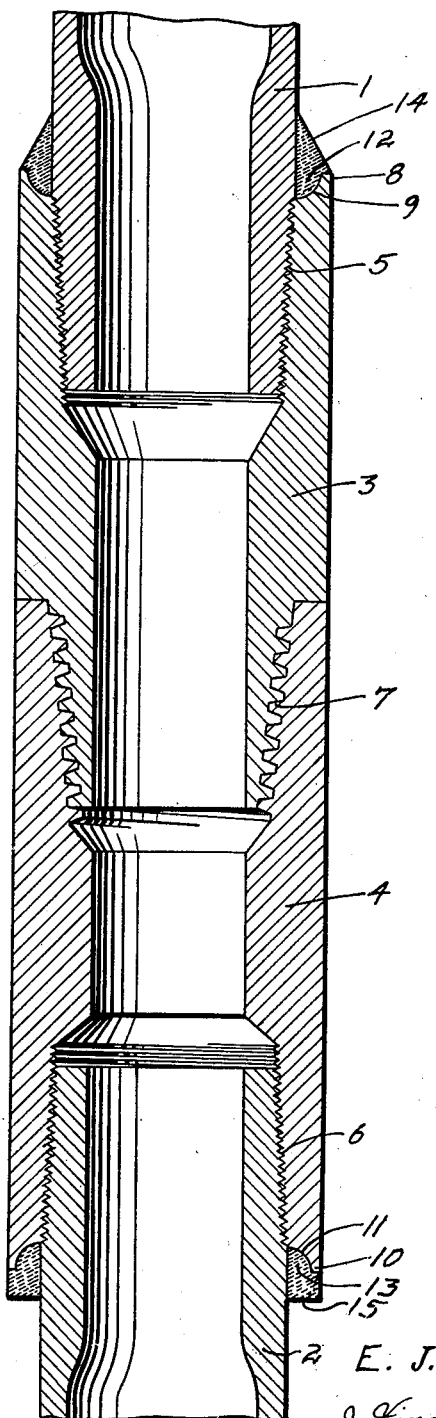
E. J. Shaffer
INVENTOR.
J. Vincent Martin
and
Ralph R. Browning.
BY
ATTORNEYS Patented Aug. 13, 1940

2,211,173

UNITED STATES PATENT OFFICE 2,211,173

PIPE COUPLING

Ernest J. Shaffer, Hutchinson, Kans.

Application June 6, 1938, Serial No. 211,983

3 Claims. (Cl. 285—146)

This invention relates to pipe joints, and is particularly applicable to that class of pipe joint utilized in joining together sections of drill pipe in making up a drill stem for use in drilling wells or the like. This type of joint is customarily referred to as a "tool joint."

The general object of this invention is to provide a pipe joint in which the failures previously occurring at the position where the joints are threaded to the pipe will be substantially avoided.

Tool joints as ordinarily constructed constitute two parts adapted to be threaded together by a coarse threaded connection and each part adapted to be threaded onto the end of an adjacent section of the drill pipe. The drill pipe is ordinarily tapered and threaded externally and the sections of the tool joint are internally tapered and threaded to fit the ends of the drill pipe section. The tool joint sections are customarily provided with a part extending beyond the internal threads for the purpose of reinforcing the tool joint against the expansive stresses set up therein when it is tightly screwed onto the drill pipe. This extension has previously been of an internal diameter somewhat greater than the external diameter of the drill pipe immediately adjacent the threads so that the only engagement between the tool joint and the drill pipe occurred along the threads which joined the same together.

It will be apparent that when such a joint is tightly screwed together there will be exerted upon the threaded portion of the drill pipe a compressive stress which will be distributed over this threaded portion but will terminate abruptly at the last thread thereon. At this point this stress will be substantially at a maximum and will abruptly fall off to substantially zero. The concentration of this stress at the notch formed by the last thread on the drill pipe has in fact been the cause of many drill pipe failures.

Many efforts have been made to avoid or reduce the failures such as above referred to. Among these efforts have been an attempt to avoid this difficulty by welding about the pipe at the end of the tool joint so as to integrally join the pipe to the tool joint at this point. However, the overhanging end of the tool joint is customarily formed of such an internal diameter that it has not been possible to put weld metal into the space between the end of the tool joint and the pipe at a position adjacent the end of the threaded connection. In fact, no attempt has been made to place weld metal in this position and the welds which have been employed at the ends of the tool joints have been at the extreme ends thereof and spaced substantially from the ends of the threaded portions where the stresses above referred to are concentrated. For this reason, the prior welding of tool joints has not served to avoid the concentration of stresses at the last thread thereon.

It is an object of this invention to provide a tool joint connection in which the concentration of stresses at the last thread on the drill pipe will be avoided.

It is a further object of this invention to provide a tool joint of the type set forth in which the concentration of stresses at the last thread on the drill pipe will be avoided without necessity for the provision of any specially formed pipe for use therewith.

Another object of this invention is to provide a method of forming a tool joint connection in which there will be a close engagement between the tool joint and the pipe section substantially from the end of the threaded connection between the same to a point spaced from the threaded connection without the necessity for the provision of specially formed pipe.

It is a further object of this invention to provide a welded tool joint in which there will be no substantial gap between the threaded connection and the welded connection by which the joint is secured to the end of a section of drill pipe.

Another object of this invention is to provide a tool joint in which there will be substantially no stresses exerted on the drill pipe at the last thread of the threaded connection with the tool joint.

Another object of this invention is to provide a tool joint in which the compressive stress exerted by the tool joint upon the drill pipe to which it is connected will be distributed over a space extending from the last thread back along the pipe.

Other objects and advantages of this invention will become apparent from the following description taken in connection with the accompanying drawing in which like numerals indicate corresponding parts throughout. It is to be understood that the structure set forth in said description and drawing are by way of illustration only and not by way of limitation, and that the scope of this invention is to be limited only by the prior art and by the terms of the appended claims.

In the drawing:

The single figure represents a vertical cross section of a tool joint constructed in accordance with this invention.

In the drawing a pair of drill pipe sections 1 and 2 are shown connected by means of a tool joint consisting of an upper pin portion 3 and a lower box portion 4. The pin portion 3 is threaded to the lower end of the drill pipe section 1 as shown at 5 in the usual manner and the box portion 4 is likewise threaded in the usual manner at 6 to the upper end of the section of drill pipe 2. The pin and box portions of the tool joint are joined by a coarse threaded connection 7.

Beyond the threads 5 the pin portion of the tool joint has an overhanging part 8 in which is formed a counterbore 9 which extends inwardly substantially to the last thread of the threaded connection. Likewise, the box portion 4 has an overhanging part 10 within which is a counterbore 11 extending to the end of the threaded connection 6. The counter-bores 9 and 11 serve to space the overhanging parts 8 and 10 a substantial distance from the outer walls of the drill pipe sections. In this space, according to this invention, there is placed a ring of weld metal indicated by the numeral 12 at the upper end of the tool joint and by the numeral 13 at the lower end thereof. The weld ring 12 at the upper end of the tool joint is provided with an external tapered portion 14 so as to avoid an abrupt shoulder between the external surface of the drill pipe section 1 and the external surface of the tool joint section 3. This will enable the drill pipe as it is being pulled upwardly to pass by any obstruction which might otherwise catch upon it and prevent it from continuing its upward movement.

The lower weld ring 13 is provided with a radial lower end surface 15 forming a shoulder at substantially right angles to the outer surface of the drill pipe section 2. This shoulder is adapted to rest upon an elevator or similar structure which is customarily clamped about the drill pipe for supporting it in raising or lowering the drill stem.

By virtue of the welded connections just referred to and by virtue of the counter-bores which make possible the placing of this welded connection in such a manner that it will extend from substantially the last thread of the threaded connection between the tool joint and the drill pipe, there has been provided a tool joint in which there is close contact and in fact an integral union between the tool joint and the drill pipe from the last thread of the threaded connection therebetween to a position spaced substantially from this last thread. In making this tool joint connection with the drill pipe it is unnecessary that specially formed drill pipe be employed because due to the welded connection there will be a part of the tool joint extending from the thread connection upwardly which will tightly engage the drill pipe regardless of the size of the drill pipe. This welded connection will not only form a complete seal between the drill pipe and the tool joint but when cooled will also serve to exert a compressive stress upon the drill pipe from the last thread where this compressive stress has heretofore been concentrated for a substantial distance beyond the last thread. It will thus avoid the concentration of stresses which heretofore existed at the last thread and will do this without necessity for any specially formed pipe or accurately formed tool joint and without necessity for the use of any special tools.

It will be apparent, therefore, that a tool joint has been provided and a method of making the same set forth whereby all of the objects sought by this invention will be accomplished.

Having described my invention, I claim:

1. In a pipe joint comprising complementary tapered pin and box members in tight threaded engagement with each other, whereby the box member exerts a compressive stress on said pin member along the zone of such threaded engagement, a ring of weld metal surrounding and joined to said pin and box members and extending from the end of said zone of threaded engagement, said ring tightly engaging said pin member to exert a compressive stress thereon for preventing the localization of vibration at the end thread beginning at the end of said zone of said threaded engagement, and with said box member to produce a continuous zone of compressive stress in said pin member bridging the end of said threaded engagement and avoiding a too abrupt change in compressive stress on said pin member at the end of said threaded engagement.

2. In a pipe joint comprising a pair of tubular members having complemental tapered threaded parts in engagement with each other, whereby a compressive stress is exerted on the inner member along the zone of threaded engagement, means integrally joining said parts together in such manner as to exert a compressive stress on said inner member for preventing the localization of vibration at the end thread over a zone beginning substantially at one extremity of said threaded engagement and extending away from said threaded engagement.

3. In a pipe joint comprising a tapered externally threaded part and a tapered internally threaded part in threaded engagement therewith whereby a compressive stress is exerted on said externally threaded part along the zone of such threaded engagement, the internally threaded part having a portion overlying and extending beyond said zone of engagement, and means integrally joining said last mentioned portion of said internally threaded part to said externally threaded part in such manner as to exert a compressive stress thereon for preventing the localization of vibration at the end thread over a zone beginning at the end of said threaded engagement and extending away from said threaded engagement.

ERNEST J. SHAFFER.